United States Patent [19]
Priester

[11] Patent Number: 6,048,939
[45] Date of Patent: Apr. 11, 2000

[54] PROCESS AID FOR MELT PROCESSIBLE POLYMERS

[75] Inventor: Donnan Edwin Priester, Greenville, Del.

[73] Assignee: Dupont Dow Elastomers, L.L.C., Wilmington, Del.

[21] Appl. No.: 09/002,410

[22] Filed: Jan. 2, 1998

Related U.S. Application Data

[60] Provisional application No. 60/034,196, Jan. 9, 1997.

[51] Int. Cl.[7] ..................................................... C08L 19/02
[52] U.S. Cl. ........................ 525/198; 525/199; 525/165; 525/178; 528/502 R; 264/176.1; 264/331.14
[58] Field of Search ..................................... 525/198, 199, 525/165, 178; 528/502 R; 264/176.1, 331.14

[56] References Cited

U.S. PATENT DOCUMENTS

| | | | |
|---|---|---|---|
| 3,125,547 | 3/1964 | Blatz | 260/45.5 |
| 3,294,871 | 12/1966 | Schmitt et al. | 525/199 X |
| 3,334,157 | 8/1967 | Larsen | 260/897 |
| 4,035,565 | 7/1977 | Apotheker et al. | 526/249 |
| 4,191,678 | 3/1980 | Smith | 260/40 |
| 4,243,770 | 1/1981 | Tatemoto et al. | 525/331 |
| 4,740,341 | 4/1988 | Chu | 264/211 |
| 4,837,074 | 6/1989 | Rosinski et al. | 525/199 X |
| 4,880,470 | 11/1989 | Hyche et al. | 106/271 |
| 5,132,368 | 7/1992 | Chapman, Jr. et al. | 525/165 |
| 5,443,910 | 8/1995 | Gose et al. | 428/407 |
| 5,464,904 | 11/1995 | Chapman, Jr. et al. | 525/200 |
| 5,587,429 | 12/1996 | Priester | 525/187 |
| 5,773,493 | 6/1998 | Bhatia et al. | 525/199 X |
| 5,854,352 | 12/1998 | Chisholm et al. | 525/199 |

FOREIGN PATENT DOCUMENTS

| | | |
|---|---|---|
| 3821481A1 | 12/1989 | Germany . |
| 62-064847 | 3/1987 | Japan . |

*Primary Examiner*—Fred Teskin

[57] ABSTRACT

Processability of non-fluorinated melt-processible polymers is improved by introducing a process aid comprising a fluoroelastomer latex or aqueous fluoropolymer dispersion to the non-fluorinated polymer and extruding the blend.

19 Claims, No Drawings

PROCESS AID FOR MELT PROCESSIBLE POLYMERS

CLAIM BENEFIT OF PRIOR APPLICATION

This application claims the benefit of U.S. Provisional Application No. 60/034,196; filed Jan. 9, 1997.

FIELD OF THE INVENTION

The present invention relates to extrusion of non-fluorinated melt-processible polymers which contain fluoropolymer processing aids.

BACKGROUND OF THE INVENTION

The melt extrusion of high molecular weight polymers, for example, hydrocarbon polymers and polyamides, into shaped structures such as tubing, pipe, wirecoating or film is accomplished by well-known procedures wherein a rotating screw pushes a viscous polymer melt through an extruder barrel into a die in which the polymer is shaped to the desired form and is then subsequently cooled and solidified into a product having the general shape of the die.

In order to achieve low production costs, it is desirable to extrude the polymer at rapid rates. Higher extrusion rates may be readily obtained by increasing the rate of revolution of the extruder screw. However, this technique is subject to limitations imposed by the viscoelastic properties of the polymer substrate. Thus, at very high extrusion rates an unacceptable amount of thermal decomposition of the polymer can result. Further, extrudates having a rough surface are often obtained which can lead to formation of an undesirable pattern on the surface of the extrudate. Extrusion at elevated temperatures obviates this problem but adds to processing costs. Also, cooling of the extrudate becomes problematic. In addition, if polyolefins are extruded at temperatures near their decomposition points, polymer degradation occurs.

It is desirable, therefore, to find highly efficient means of increasing the extrusion rate without raising the melt temperature, while producing articles having smooth surfaces. Changes in extruder and die configuration can improve polymer melt flow, but these modifications are not always practical or economically feasible. Another approach involves the addition of conventional wax-type process aids which reduce bulk viscosity and in some cases improve processing properties. However, the efficiency is marginal and the high levels of additive required often adversely affect other properties.

In Blatz, U.S. Pat. No. 3,125,547, it is disclosed that the use of 0.01–2.0 wt. % of a fluorocarbon polymer that is in a fluid state at process temperature, such as a fluoroelastomer, will reduce die pressure in extrusions of high and low density polyethylenes and other polyolefins. Further, use of this additive allows significant increase in extrusion rates without melt fracture.

Kamiya and Inui, in Japanese Patent Application Publication Kokoku 45-30574 (1970, examined), cite the use of crystalline fluorocarbon polymers at temperatures below their melting points to eliminate die build-up, but they disclose nothing regarding other extrusion improvements.

Nishida, et al., in Japanese Patent Application Publication Kokai 62-64847, disclose injection molding compositions comprising a mixture of a) an ethylene/alpha olefin copolymer having a melt flow rate (MFR) of 0.2–200 g/10 minutes and a density of 0.850–0.945 g/cm$^3$, with b) 0.001–1% by weight of a fluorinated hydrocarbon polymer having a fluorine to carbon ratio of at least 1:2.

Chu, in U.S. Pat. No. 4,740,341, discloses blends having improved extrudability comprising linear polymers of ethylene having incorporated therein small amounts of fluorocarbon polymers and polysiloxanes. The fluorocarbon polymers have fluorine to carbon ratios of at least 1:2 and are fluid at 120°–300° C.

Larsen, in U.S. Pat. No. 3,334,157, discloses polyethylene which has been modified to improve its optical properties by incorporation of 0.015 to greater than 1.7% by wt., based on the mixture, of finely divided polytetrafluoroethylene.

More recently, improved fluoropolymer process aid compositions have been disclosed in for example, U.S. Pat. Nos. 5,464,904; 5,132,368; and 5,587,429.

In order to maximize processibility improvements, it is desirable that the fluoropolymer process aid compositions be well dispersed in the non-fluorinated polymer which is to be extruded. Generally, the smaller the particle size of the fluoropolymer, the better the dispersion. However, it is quite difficult to prepare process aid masterbatches which contain small particle size fluoropolymers using conventional mixing techniques.

It is an object of this invention to provide non-fluorinated resin compositions having incorporated therein well-dispersed fluoropolymer process aids, thereby resulting in extrudable melt-processible compositions having substantially improved processability characteristics. That is, it is an object of the invention to provide melt-processible compositions which can be extruded at rapid rates, low die pressures, and low melt temperatures to provide shaped articles having excellent surface quality.

SUMMARY OF THE INVENTION

The present invention provides a process for extruding non-fluorinated melt processible polymers comprising the steps of a) introducing a composition comprising a process aid selected from the group consisting of fluoroelastomer latexes and aqueous thermoplastic fluoropolymer dispersions to a non-fluorinated melt processible polymer to form an extrudable polymer composition; and b) extruding said polymer composition.

The invention is further directed to an extrudable polymer composition comprising a blend of a non-fluorinated melt processible polymer and a process aid, said blend being prepared by i) mixing said non-fluorinated melt processible polymer and a composition comprising a process aid selected from the group consisting of a fluoroelastomer latex and an aqueous thermoplastic fluoropolymer dispersion to form an aqueous mixture and ii) evaporating sufficient water from said aqueous mixture to provide an extrudable composition.

DETAILED DESCRIPTION OF THE INVENTION

The present invention is directed to a process for improving the extrusion behavior of non-fluorinated melt processible polymers such as hydrocarbon resins, polyamides, chlorinated polyethylene, polyvinyl chloride, and polyesters. By the term "non-fluorinated" it is meant that the ratio of fluorine atoms to carbon atoms present in the polymer is less than 1:1. The term "extrusion behavior" is intended to include such parameters as the die pressure reached during extrusion, operating melt temperatures and maximum extrusion rates that can be achieved while maintaining melt stability, and good extrudate surface quality. Thus, the non-fluorinated melt-processible polymers disclosed herein may be extruded at significantly lowered die pressures in accordance with the process of the invention while maintaining high extrusion rates and excellent surface smoothness of extruded articles. In the case of blown films disclosed herein, improved clarity results.

The non-fluorinated melt-processible polymers of this invention may be selected from a variety of polymer types. One such type includes hydrocarbon polymers having melt indexes (ASTM D1238) at 190° C. of 5.0 g/10 minutes or less, preferably 2.0 g/10 minutes or less. The hydrocarbon polymers may be elastomeric copolymers of ethylene, propylene, and optionally a non-conjugated diene monomer, for example 1,4-hexadiene. In general, hydrocarbon polymers also include any thermoplastic hydrocarbon polymer obtained by the homopolymerization or copolymerization of a monoolefin of the formula $CH_2=CHR$, where R is H or an alkyl radical, usually of not more than eight carbon atoms. In particular, this invention is applicable to polyethylene, of both high density and low density, for example, polyethylenes having a density within the range 0.89 to 0.97 $g/cm^3$; polypropylene; polybutene-1; poly(3-methylbutene); poly (methylpentene); and linear low density copolymers of ethylene and alpha-olefins such as propylene, butene-1, octene-1, decene-1, and octadecene. Hydrocarbon polymers may also include vinyl aromatic polymers such as polystyrene. Because specific hydrocarbon polymers exhibit differing melt characteristics, the practice of this invention may have greater utility in some hydrocarbon polymers than in others. Thus, hydrocarbon polymers such as polypropylene and branched polyethylene that are not of high molecular weight have favorable melt flow characteristics even at lower temperatures, so that surface roughness and other surface defects can be avoided by adjustment of extrusion conditions. These hydrocarbon polymers may only require the use of the fluorocarbon polymer extrusion aids and process of this invention under unusual and exacting extrusion conditions. However, other polymers such as high molecular weight, high density polyethylene, linear low density polyethylene copolymers, high molecular weight polypropylene, and propylene copolymers with other olefins, particularly those with narrow molecular weight distributions, do not permit this degree of freedom in variation of extrusion conditions. It is particularly with these resins that improvements in the surface quality of the extruded product and reduction in extrusion pressures are obtained with the compositions of this invention.

Other non-fluorinated melt-processible polymers of this invention include polyamides and polyesters. Specific examples of polyamides useful in the practice of this invention are nylon 6, nylon 6/6, nylon 6/10, nylon 11 and nylon 12. Suitable polyesters include polyethylene terephthalate and polybutylene terephthalate.

The fluoropolymer process aids useful in this invention may be elastomeric fluoropolymers (i.e. fluoroelastomers) or thermoplastic fluoropolymers (i.e. fluoroplastics). Fluoroelastomers useful in this invention are fluoropolymers that are normally in the fluid state at room temperature and above, i.e. fluoropolymers which have values of $T_g$ below room temperature and which exhibit little or no crystallinity at room temperature. It is preferred, but not essential, to employ fluoroelastomers having a fluorine to hydrogen ratio of at least 1:1.5. Fluorinated monomers which may be copolymerized to yield suitable fluoroelastomers include vinylidene fluoride, hexafluoropropylene, chlorotrifluoroethylene, tetrafluoroethylene and perfluoroalkyl perfluorovinyl ethers. Specific examples of the fluoroelastomers which may be employed include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride, all of which are known in the art. In some cases these copolymers may also include bromine-containing comonomers as taught in Apotheker and Krusic, U.S. Pat. No. 4,035,565, or terminal iodo-groups, as taught in U.S. Pat. No. 4,243,770. The latter patent also discloses the use of iodo group-containing fluoroolefin comonomers. When fluorinated monomers are present in these copolymers in certain molar ratios, the glass transition temperature of the polymer is near or below 0° C., and the compositions are useful elastomers that are readily available articles of commerce.

Thermoplastic fluoropolymers which may be used in the invention include homopolymers and copolymers of tetrafluoroethylene (such as Teflon® FEP fluorocarbon resin) and polyvinylidene fluoride.

When used in the process of the present invention, the fluoropolymer process aids are in the form of fluoroelastomer latexes or aqueous fluoroplastic dispersions. By fluoroelastomer latex is meant a water-based emulsion of fluoroelastomer and at least one surfactant. The latex may either be the unisolated product of an emulsion polymerization or it may be prepared from dried, isolated fluoroelastomer. Thermoplastic fluoropolymer process aids used in the present invention are in the form of aqueous fluoropolymer dispersions. By fluoropolymer dispersion is meant a water-based emulsion of thermoplastic fluoropolymer and at least one surfactant.

In the process of the present invention, fluoroelastomer latex or aqueous thermoplastic dispersion is introduced into a non-fluorinated melt-processible polymer. The addition of the fluorocarbon polymer process aids to the non-fluorinated melt-processible polymer can be accomplished by any of the means heretofore developed for the addition of process aids to such polymers. For example, the fluoroelastomer latex or thermoplastic fluoropolymer aqueous dispersion may be directly added to a non-fluorinated melt processible polymer on a rubber compounding mill or in a Banbury or other internal mixer or in a mixing extruder. In all these mixing processes the process aid is uniformly distributed throughout the non-fluorinated melt processible polymer and the water is evaporated away. It is also feasible to coat the non-fluorinated melt processible polymer with either fluoroelastomer latex or thermoplastic fluoropolymer dispersion prior to introducing the melt processible polymer into the extruder. Such coating could take place by, for example, spray coating pellets of melt processible polymer with latex or dispersion and evaporating the water so as to form a coating of process aid on the pellets.

Alternatively, masterbatch dispersions (mixtures) of process aid in a diluent polymer can be metered to the feed section of the extruder by appropriate devices. The diluent polymer can be the same non-fluorinated melt-processible polymer to be extruded, or it can be a second non-fluorinated melt processible polymer that does not deleteriously affect the extrusion behavior of the first non-fluorinated melt processible polymer/process aid composition. In preparing such masterbatches, the amount of process aid added will usually be such that it provides 1–25 wt. % dry processing aid fluoropolymer (based on the total weight of the masterbatch), preferably 1–10 wt. %, in the masterbatch. Masterbatches can be made, for example, by mixing the appropriate amount of fluoroelastomer latex or thermoplastic fluoropolymer aqueous dispersion with diluent polymer in a Brabender mixer at a temperature above the melting point of the non-fluorinated melt processible polymer so as to form a well mixed masterbatch and also to eliminate the majority of the water. In preparing the masterbatch, the concentration of process aid and diluent polymer will be selected so as to achieve good mixing of all ingredients.

Quantities of process aid in excess of 1 wt. % (based on the weight of dried fluoroelastomer or thermoplastic fluoropolymer and the total weight of the non-fluorinated polymer composition to be extruded into an article) are not necessary. In general, the process aid fluoropolymers are not compatible with non-fluorinated melt processible polymers. That is to say, the process aids are not soluble therein. Large amounts of incompatible fraction may adversely affect the optical properties of the extrudate. Such is the case, for example, when the non-fluorinated melt processible polymer is a hydrocarbon polymer. Incorporation of a minimum concentration of process aid, equivalent to 25 ppm dry fluoropolymer, in the non-fluorinated melt processible polymer is generally required in order to effect a measurable improvement in extrusion behavior. The typical useful range of processing aid is that equivalent to about 100 to about 1000 ppm dry fluoropolymer.

It will be recognized by one skilled in the art that it may not be possible to achieve maximum reduction of die pressure, increase of throughput and improvement in surface quality simultaneously at a given concentration of process aid. Thus, one might elect to attain maximum improvement of one particular parameter at the expense of corresponding improvements in other parameters. For example, increased throughput of extrudate with high quality surface characteristics may not necessarily be accompanied by reduced die pressure. The optimum set of conditions will be determined by the specific requirements of the particular extrusion.

In the practice of this invention, the beneficial effects are not necessarily observed immediately at the onset of extrusion, and depending on the overall concentrations of process aid, it may take from 10 minutes to 8 hours to reach a stable extrusion rate and die pressure. Longer times are generally required at low concentrations of process aid. When it is desirable to operate at very low levels of process aid and more quickly achieve and equilibrium state, it may be expedient to first "condition" the extruder rapidly using a composition containing 0.1 to 1 wt. % of the process aid, then convert to the desired concentration.

The beneficial effects of the addition of process aid on extrudability may continue to be observed after addition of the process aid is discontinued. Consistent with this observation, after stable extrusion rate and die pressure are achieved, the beneficial effects of the invention may be realized by alternating a feed of non-fluorinated melt-processible polymer which does not contain fluoropolymer process aid with one containing the processing aid of the invention.

The process of the invention is particularly useful in extrusions of melt processible polyolefins. Such extrusion processes are commonly used in manufacture of blown films and wire and cable jacketing.

EXAMPLES

A C. W. Brabender Computerized Plasti-Corder equipped with a 19.1 mm. (¾ in.) diameter extruder with a 25/1 length/diameter ratio was employed for the evaluations described in the following examples. The Plasti-Corder was equipped with a screw having ten feed flights, ten compression flights with a compression ratio of 3:1, and five metering flights. Operating parameters were controlled by four independent heating zones (Zone 4 was closest to the die), a pressure transducer, and a torque-measuring drive unit with 1–120 rpm capability. The instrument was equipped with software for extrusion testing. The tape die, of #416 stainless steel, had a width of 2.54 cm and a gap of 0.5 mm. In operation, the required machine conditions were set and the polymer resin was then extruded, usually at 60 rpm, until equilibrium (constant throughput and constant die pressure) was attained. Surface quality of the extrudate was judged by visual examination. For purposes of comparison, "melt fracture" is defined as a herringbone-like roughness on the surface of the extrudates.

After each run the extruder was thoroughly cleaned. The equipment was first purged with a highly filled abrasive composition [KC-60 available from A. Schulman S.A. (Belgium)]. It was disassembled and each section, i.e. screw, barrel, die assembly, and transducer, was cleaned, first with a wire brush, and then with methyl ethyl ketone solvent. After reassembly and calibration of the transducer, the unmodified hydrocarbon resin was run first to establish equilibrium conditions, and to assure that reliable output was obtained. If previously established equilibrium values for unmodified resin were not achieved, the cleanout procedure was repeated.

The high molecular weight linear low density polyethylene (LLDPE) used in the following examples was a commercially available ethylene butene-1 copolymer [density 0.918 $cm^3$ and melt index (ASTM D-1238, condition E) of 1.0 g/10 minutes]. The fluoroelastomer was a commercially available vinylidene fluoride/hexafluoropropylene copolymer (60:40 comonomer weight ratio; Mooney viscosity ML-4, 60@121° C.).

Comparative Example A

A pelletized masterbatch was prepared by mixing 98 g LLDPE and 2 g dry (i.e. not fluoroelastomer latex) fluoroelastomer in a Brabender mixer at 155° C. The pelletized masterbatch was added to LLDPE at room temperature in an amount of 0.5 parts masterbatch to 99.5 parts LLDPE so that the resulting blend contained 100 ppm fluoroelastomer. The masterbatch/LLDPE blend was introduced to the Brabender Plasti-Corder with the screw operating at 60 rpm and heating zones 1, 2, 3 and 4 controlled at nominal temperature settings of 150° C., 180° C., 200° C. and 204° C., respectively. (Zone 4 was closest to the die.) The appearance of the extrudate was monitored with time. The time at which extrudate began to be produced without evidence of melt fracture was 30 minutes.

Comparative Example B

Extrusion and masterbatch preparation were carried out in substantially the same manner as described in Comparative Example A except that the masterbatch was prepared in a Banbury mixer at 180° C. and it contained 98 parts LLDPE, 1.95 parts dry fluoroelastomer and 0.05 g Teflon® FEP fluorocarbon resin. The time at which extrudate began to be produced without evidence of melt fracture was 33 minutes.

Example 1

Extrusion and masterbatch preparation was carried out in substantially the same manner as described in Comparative Example A except that the masterbatch contained 98 g LLDPE and 5.3 g of a fluoroelastomer latex (38 wt. % fluoroelastomer, 1.4 parts Zonyl® FSA surfactant (available from E. I. Du Pont de Nemours and Co.) per 100 parts fluoroelastomer, 0.1 part Fluorad® FC-143 surfactant (available from 3M Co.) per 100 parts fluoroelastomer, and water. The time at which extrudate began to be produced without evidence of melt fracture was 20 minutes. This represents a substantial improvement compared to extrusions using the prior art process aid masterbatches of the comparative examples.

Example 2

Extrusion was carried out substantially as described in Example 1 except that no process aid masterbatch was used. Instead, 0.26 g fluoroelastomer latex was added directly to 1 kg LLDPE and the resulting mixture was extruded. The time at which extrudate began to be produced without evidence of melt fracture was 23 minutes. This illustrates the significant improvement in extrusion behavior obtained through use of the process of the present invention.

I claim:

1. A process for extruding a non-fluorinated melt processible polymer in the form of a film comprising the steps of:
   a) introducing a composition comprising a fluoroelastomer latex process aid to a non-fluorinated melt processible polymer to form an extrudable polymer composition; and
   b) extruding said polymer composition.

2. The process of claim 1 wherein the fluoroelastomer latex is a water-based emulsion of a vinylidene fluoride copolymer elastomer.

3. The process of claim 1 wherein the fluoroelastomer latex is a water-based emulsion of a tetrafluoroethylene copolymer elastomer.

4. The process of claim 1 wherein the non-fluorinated melt processible polymer is a hydrocarbon polymer.

5. The process of claim 1 wherein the non-fluorinated melt processible polymer is a polyamide.

6. The process of claim 1 wherein the non-fluorinated melt processible polymer is a polyester.

7. The process of claim 1 wherein an amount of fluoroelastomer latex is introduced to the non-fluorinated melt processible polymer in step a) to provide an extrudable composition having a concentration of fluoroelastomer which is the equivalent of at least 25 ppm dry fluoroelastomer in the melt processible polymer.

8. The process of claim 7 wherein an amount of fluoroelastomer latex is introduced to the non-fluorinated melt processible polymer in step a) to provide an extrudable composition having a concentration of fluoroelastomer which is the equivalent to 100–1000 ppm dry fluoroelastomer in the melt processible polymer.

9. An extrudable polymer composition comprising a blend of a non-fluorinated melt processible polymer and a process aid, said blend being prepared by i) mixing said non-fluorinated melt processible polymer and a composition comprising a fluoroelastomer latex process aid to form an aqueous mixture, and ii) evaporating sufficient water from said aqueous mixture to provide an extrudable composition which can be extruded into a film.

10. The composition of claim 9 wherein the fluoroelastomer latex is a water-based emulsion of a vinylidene fluoride copolymer elastomer.

11. The composition of claim 9 wherein the fluoroelastomer latex is a water-based emulsion of a tetrafluoroethylene copolymer elastomer.

12. The composition of claim 9 wherein the non-fluorinated melt processible polymer is a hydrocarbon polymer.

13. The composition of claim 9 wherein the non-fluorinated melt processible polymer is a polyamide.

14. The composition of claim 9 wherein the non-fluorinated melt processible polymer is a polyester.

15. The extrudable polymer composition of claim 9 wherein the blend is prepared by mixing an amount of fluoroelastomer latex and non-fluorinated melt processible polymer to provide an extrudable composition having a concentration of fluoroelastomer which is the equivalent of at least 25 ppm dry fluoroelastomer in the melt processible polymer.

16. The extrudable polymer composition of claim 15 wherein the blend is prepared by mixing an amount of fluoroelastomer latex and non-fluorinated melt processible polymer to provide an extrudable composition having a concentration of fluoroelastomer which is the equivalent of 100–1000 ppm dry fluoroelastomer in the melt processible polymer.

17. A masterbatch composition comprising a blend of a non-fluorinated melt processible polymer and a process aid, said blend being prepared by i) mixing said non-fluorinated melt processible polymer and a composition comprising a fluoroelastomer latex process aid to form an aqueous mixture, and ii) evaporating the majority of the water from said aqueous mixture.

18. A composition of claim 17 wherein the blend is prepared by mixing an amount of fluoroelastomer latex and non-fluorinated melt processible polymer to provide a masterbatch having a concentration of fluoroelastomer which is the equivalent of 1–25 weight percent dry fluoroelastomer in the melt processible polymer.

19. A composition of claim 17 wherein the blend is prepared by mixing an amount of fluoroelastomer latex and non-fluorinated melt processible polymer to provide a masterbatch having a concentration of fluoroelastomer which is the equivalent of 1–10 weight percent dry fluoroelastomer in the melt processible polymer.

* * * * *

UNITED STATES PATENT AND TRADEMARK OFFICE
CERTIFICATE OF CORRECTION

PATENT NO. : 6,048,939  
APPLICATION NO. : 09/002410  
DATED : April 11, 2000  
INVENTOR(S) : Donnan Edwin Priester Page 1 of 1

It is certified that error appears in the above-identified patent and that said Letters Patent is hereby corrected as shown below:

column 6, line 37, 121 should read 100

Signed and Sealed this

Fourth Day of March, 2008

JON W. DUDAS  
*Director of the United States Patent and Trademark Office*